United States Patent
Imagawa et al.

(10) Patent No.: US 10,604,447 B2
(45) Date of Patent: Mar. 31, 2020

(54) FIBER-CONTAINING ROOF TILE, MOLDING MATERIAL FOR PRODUCING FIBER-CONTAINING ROOF TILE, AND PROCESS FOR PRODUCING SAME

(71) Applicant: Kuraray Co., LTD., Kurashiki-shi (JP)

(72) Inventors: Akira Imagawa, Okayama (JP); Shinya Inada, Okayama (JP); Yoshihiro Iwasaki, Osaka (JP); Saburo Hada, Tsurugashima (JP)

(73) Assignee: KURARAY CO, LTD., Kurashiki-shi (JP)

( * ) Notice: Subject to any disclaimer, the term of this patent is extended or adjusted under 35 U.S.C. 154(b) by 36 days.

(21) Appl. No.: 15/539,385

(22) PCT Filed: Dec. 24, 2015

(86) PCT No.: PCT/JP2015/086027
§ 371 (c)(1),
(2) Date: Jun. 23, 2017

(87) PCT Pub. No.: WO2016/104603
PCT Pub. Date: Jun. 30, 2016

(65) Prior Publication Data
US 2017/0369370 A1 Dec. 28, 2017

(30) Foreign Application Priority Data

Dec. 26, 2014 (JP) .................................. 2014-265070
Apr. 28, 2015 (JP) .................................. 2015-091952

(51) Int. Cl.
C04B 16/06 (2006.01)
B28B 11/16 (2006.01)
(Continued)

(52) U.S. Cl.
CPC ............ *C04B 16/0641* (2013.01); *B28B 1/52* (2013.01); *B28B 3/12* (2013.01); *B28B 3/123* (2013.01);
(Continued)

(58) Field of Classification Search
CPC .... E04D 1/04; E04D 1/16; E04D 1/06; C04B 2111/00594; C04B 16/0633;
(Continued)

(56) References Cited

U.S. PATENT DOCUMENTS 4,588,443 A * 5/1986 Bache ................. B28B 23/0081
106/644
4,673,659 A 6/1987 Wood et al.
5,106,557 A 4/1992 Rirsch et al.

FOREIGN PATENT DOCUMENTS

JP 61-091080 A 5/1986
JP 01-192813 A 8/1989
(Continued)

OTHER PUBLICATIONS

International Search Report dated Feb. 23, 2016 in PCT/JP2015/086027, filed Dec. 24, 2015.
(Continued)

*Primary Examiner* — Camie S Thompson
(74) *Attorney, Agent, or Firm* — Oblon, McClelland, Maier & Neustadt, L.L.P.

(57) ABSTRACT

A roof tile containing fibers which satisfy the following requirements (1) to (3):
(1) to have an average fiber diameter of 50 μm or less;
(2) to have an aspect ratio of 50 to 2000; and
(3) to have three or less buckled portions per fiber.

14 Claims, 2 Drawing Sheets

(51) Int. Cl.
*E04D 1/16* (2006.01)
*B28B 1/52* (2006.01)
*B28B 5/02* (2006.01)
*B28B 3/12* (2006.01)
*C04B 14/06* (2006.01)
*C04B 18/02* (2006.01)
*C04B 28/04* (2006.01)
*E04D 1/04* (2006.01)
*C04B 111/00* (2006.01)
*C04B 111/40* (2006.01)

(52) U.S. Cl.
CPC .............. *B28B 5/028* (2013.01); *B28B 11/16* (2013.01); *C04B 14/06* (2013.01); *C04B 16/0633* (2013.01); *C04B 18/027* (2013.01); *C04B 28/04* (2013.01); *E04D 1/04* (2013.01); *E04D 1/16* (2013.01); *C04B 2111/00594* (2013.01); *C04B 2111/40* (2013.01); *Y02W 30/94* (2015.05)

(58) Field of Classification Search
CPC . C04B 16/0641; C04B 16/0625; C04B 14/06; C04B 211/40; C04B 211/00594; C04B 211/0633; C04B 211/0641; C04B 211/0625; C04B 211/0691
USPC ......... 428/292.1, 299.1, 299.4, 294.7, 312.4, 428/357, 364, 359, 397, 400, 401
See application file for complete search history.

(56) References Cited

FOREIGN PATENT DOCUMENTS

| JP | 2-084303 A | 3/1990 |
| JP | 03-236907 A | 10/1991 |
| JP | 04-179502 A | 6/1992 |
| JP | 04-350242 A | 12/1992 |
| JP | 06-293540 A | 10/1994 |
| JP | 07-076013 A | 3/1995 |
| JP | 2002-361620 A | 12/2002 |
| JP | 2014-195957 A | 10/2014 |

OTHER PUBLICATIONS

Extended European Search Report dated Jul. 17, 2018 in European Patent Application No. 15873171.1, 8 pages.
Sun, C. T. et al. "Compressive Strength of Unidirectional Fiber Composites with Matrix Non-Linearity", Composites Science and Technology, XP055478909, vol. 52, No. 4, Jan. 1, 1994, pp. 577-587.
International Preliminary Report on Patentability and Written Opinion dated Jul. 6, 2017 in PCT/JP2015/086027 (with English translation only).
European Office Action dated Jul. 30, 2019, in Patent Application No. 15 873 171.1, 4 pages.
Hughes, M., "Defects in natural fibres: their origin, characteristics and implications for natural fibre-reinforced composites", Journal of Materials Science, Kluwer Academic Publishers, BO, XP019990571, vol. 47, No. 2, Oct. 19, 2011, pp. 599-609.

* cited by examiner

FIBER-CONTAINING ROOF TILE, MOLDING MATERIAL FOR PRODUCING FIBER-CONTAINING ROOF TILE, AND PROCESS FOR PRODUCING SAME

TECHNICAL FIELD

The disclosure relates to a fiber-containing roof tile which has a high strength and a high lightweight property, as well as a molding material for producing the fiber-containing roof tile and a process for producing the same.

BACKGROUND OF THE INVENTION

A roof tile produced from a hydraulic material such as mortar and concrete has been widely used as an architectural material in the world. Generally, a roof tile used as a roof material requires a lightweight property in terms of decreased structure strength, quake resistance and the like. However, if a roof tile is made thin for a lightweight property, there has been a problem that the roof tile has a lowered strength and an inferior durability.

Therefore, various proposals have been made for improving its strength while maintaining its lightweight property. For example, Patent Literature 1 proposes a lightweight concrete roof tile whose lightweight property and strength are improved by adding non-thixotropic silica fume and a dispersant for silica fume into a hydraulic material to form a reaction product of the non-thixotropic silica fume and lime. In addition, Patent Literature 2 discloses a lightweight concrete flat roof tile in which a fiber-mixed layer formed with mortar comprising mixed fibers and a mortar layer comprising no fibers are laminated.

PRIOR ART DOCUMENTS

Patent Literature

Patent Literature 1: JP S61-91080 A
Patent Literature 2: JP H4-179502 A

SUMMARY OF THE DISCLOSURE

Problems to be Solved by the Invention

However, although Patent Literature 1 intends to improve the strength of the lightweight concrete roof tile due to silica fume, it is difficult to sufficiently reinforce the strength of the concrete roof tile with silica fume, which is a definitely fine particle.

The lightweight concrete flat roof tile described in Patent Literature 2 partly has the fiber-mixed layer in which fibers are mixed, but its strength is insufficient since the roof tile still comprises the mortar layer comprising no fibers. In addition, due to the two-layer structure of the fiber-mixed layer and the mortar layer, the total thickness of the roof tile cannot be reduced, and its lightweight property and thinness are inferior.

Therefore, an object of the present invention is to provide a fiber-containing roof tile having a high strength and a high lightweight property, as well as a molding material for producing the fiber-containing roof tile and a process for producing the same.

Means for Solving Problems

The inventors have earnestly conducted a study concerning a fiber-containing roof tile and its production process so as to solve the object, and completed the present invention.

That is, the present invention includes the following preferable embodiments:

[1] A roof tile containing fibers which satisfy the following requirements (1) to (3):
(1) to have an average fiber diameter of 50 μm or less;
(2) to have an aspect ratio of 50 to 2000; and
(3) to have three or less buckled portions per fiber.

[2] The roof tile according to [1], wherein the roof tile has an upper surface hardened by non-mold shaping, a lower surface hardened by mold shaping, and side surfaces, and wherein the roof tile has a cut end surface on at least one of the side surfaces.

[3] The roof tile according to [1] or [2], wherein a 30 mm×150 mm cut piece of the roof tile has a bending strength of 5 $N/mm^2$ or higher.

[4] The roof tile according to any one of [1] to [3], wherein a content of a fiber agglomerate having an equivalent circle diameter of 3 mm or more is 25% by weight or less relative to the total content of the fibers.

[5] The roof tile according to any one of [1] to [4], wherein a CV value as dispersion variance of the fibers is 35% by weight or less.

[6] The roof tile according to any one of [1] to [5], wherein the roof tile has a content of the fibers of from 0.1 to 2% by weight.

[7] The roof tile according to any one of [1] to [6], wherein the fibers are at least one type selected from the group consisting of a polyvinyl alcohol-based fiber, a polyethylene fiber, a polypropylene fiber, an acrylic fiber and an aramid fiber.

[8] The roof tile according to any one of [1] to [7], wherein the roof tile comprises a fine aggregate, and wherein the fine aggregate has an average particle diameter of from 0.1 to 5 mm.

[9] A molding material for producing the roof tile according to any one of [1] to [8], wherein the molding material comprises at least cement, a fine aggregate, fibers and water, and wherein a content of a fiber agglomerate having an equivalent circle diameter of 3 mm or more is 25% by weight or less relative to the total content of the fibers.

[10] Use of a fiber composed of at least one selected from the group consisting of a polyvinyl alcohol-based fiber, a polyethylene fiber, a polypropylene fiber, an acrylic fiber and an aramid fiber, for producing the roof tile according to any one of [1] to [8].

[11] A process for producing the roof tile according to any one of [1] to [8], wherein the process comprises:
a preparation step of adding fibers into a mixture comprising cement, a fine aggregate and water at an addition rate of 5 kg/sec or less per ton of solid content of the mixture and simultaneously dispersing the fibers to obtain a molding material;
a supplying step of supplying the molding material into a hopper of a roller/slipper type extrusion device;
a filling step of filling a plurality of adjacent pallets with the supplied molding material from a lower side of the hopper;
a compressing step of compressing the molding material with a roller and a slipper to form a continuous band on the pallets;
a cutting step of cutting the band with a cutting blade to form individual unhardened roof tiles on the individual pallets; and
a hardening step of hardening the unhardened roof tiles.

[12] The process according to [11], wherein a content of a fiber agglomerate having an equivalent circle diameter of 3 mm or more in the molding material obtained in the preparation step is 25% by weight or less relative to the total content of the fibers.

[13] The process according to [11] or [12], wherein a CV value as dispersion variance of the fibers in the molding material obtained in the preparation step is 35% by weight or less.

[14] The process according to any one of [11] to [13], wherein the fibers are subjected to disaggregation treatment and then used in the preparation step, wherein the disaggregation treatment is at least one treatment selected from the group consisting of a treatment of passing the fibers between facing rotation gears to disaggregate the fibers; a treatment of hooking the fibers on a roll having protrusions to disaggregate the fibers; a treatment of disaggregating the fibers by a shearing force of a rotary disk having a groove; and a treatment of disaggregating the fibers by a collision force of air flow.

Effect of the Invention

According to one embodiment of the present invention, a fiber-containing roof tile having a high strength and a high lightweight property can be provided, and a molding material for producing the fiber-containing roof tile and a process for producing the same can be provided.

MODES FOR CARRYING OUT THE INVENTION

Figure 1:
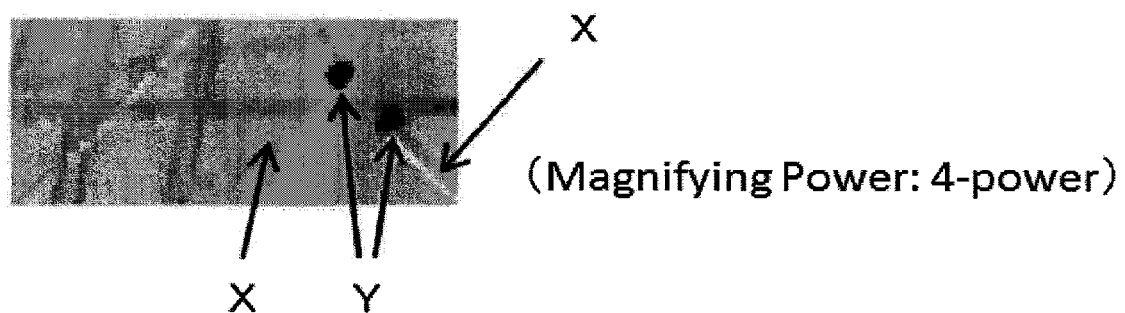
FIG. 1 is an electron micrograph showing an example of the buckled portions present in a fiber.

The roof tile according to one embodiment of the present invention comprises fibers which satisfy the following requirements (1) to (3):
(1) to have an average fiber diameter of 50 μm or less;
(2) to have an aspect ratio of 50 to 2000; and
(3) to have three or less buckled portions per fiber.

The roof tile according to one embodiment of the present invention may comprise cement in addition to the fibers. In addition, the roof tile according to one embodiment of the present invention may optionally comprise a fine aggregate and/or various admixtures, if necessary.

(Fiber)

The fibers in the present invention have an average fiber diameter of 50 μm or less, preferably 20 μm or less and more preferably 15 μm or less, and preferably 1 μm or more and more preferably 3 pin or more. When the average fiber diameter of the fibers is not more than the above upper limit value, the flexibility of the fibers is maintained, a molding material comprising cement and the fibers can be mixed with little resistance, the reduction of flowability caused by mixing the fibers can be effectively suppressed, and the strength of the fibers themselves can be maintained, and as a result, the reinforcing performance for the roof tiles can be enhanced. In addition, since the specific surface area of the fibers is increased and the adhesion to the roof tile is improved, the roof tile can be effectively reinforced. Furthermore, when the average fiber diameter of the fibers is not less than the above lower limit value, the fibers tend not to get entangled with each other so that the dispersibility of the fibers can be enhanced and the moldability of the molding material comprising cement and the fibers can be improved, and as a result, good appearance of the roof tile and sufficient reinforcing performance for the roof tile can be obtained. The average fiber diameter can be calculated as an average value of 100 fibers in total by taking out each one fiber at random and measuring its fiber diameter at the central portion in the length direction of the fiber using an optical microscope.

The fibers in the present invention have an aspect ratio of 50 to 2000, preferably 55 to 1500, more preferably 60 to 1000. When the aspect ratio of the fibers is within the above range, the fibers tend not to get entangled with each other and it is easy to uniformly disperse the fibers in the molding material, and as a result, reinforcing performance can be enhanced and a roof tile having good appearance can be obtained. If the aspect ratio is less than 50, the reinforcing performance of the fibers may remarkably decrease. If the aspect ratio is more than 2000, the fibers easily get entangled and sufficient reinforcing performance may not be obtained. The aspect ratio means a ratio (L/D) of the fiber length (L) to the fiber diameter (D). In the present invention, the aspect ratio can be determined by calculating the average fiber length according to JIS L 1015 "Chemical fiber staple test method (8.5.1)" and calculating the aspect ratio of the fiber from the ratio of the average fiber length to the average fiber diameter.

The fibers in the present invention have 3 or less buckled portions per fiber, preferably 2.5 or less buckled portions per fiber, and more preferably 2 or less buckled portions per fiber. In the present invention, the buckled portion is a defective portion of the fiber, and for example, as shown in FIG. 1, a portion at which the fiber is buckled. Since the buckled portion makes a tensile strength of the fiber lowered, the number of fibers contributing to reinforcement of the roof tile is substantially reduced even if the number of the fibers themselves is sufficient, and each of the fibers has a lowered strength. Therefore, it is difficult to obtain a reinforcing effect provided by the fibers, and additionally, the fibers are bent around the buckled portions so that the fibers easily get entangled with each other, and the uniform dispersion of the fibers is inhibited. For example, when a molding material (hydraulic material) comprising cement is mixed with fibers together, the buckled portion is formed by physical impact provided from stirring factors (blade shape, stirring speed, stirring time, and the like) of a mixer, aggregate factors (size, shape, specific gravity, hardness, and the like), and the like. When the number of the buckled portion of the fiber is not more than the above upper limit value, an effect on decrease in the strength of the fiber is small, and the fibers tend not to get entangled with each other and it is easy to uniformly disperse the fibers in the molding material, and thus, a sufficient reinforcing effect can be obtained. If the number of the buckled portion of the fiber is more than three per fiber, a reinforcing performance of the fiber is remarkably lowered, and additionally the appearance of the roof tile may be impaired. In the present invention, the lower limit value of the number of the buckled portion of the fiber is usually 0 or more per fiber. The number of the buckled portion of the fiber can be determined by the method described later.

An average fiber strength of the fiber in the present invention is not particularly limited, and may be preferably 5 cN/dtex or higher, more preferably 6 cN/dtex or higher, further preferably 7 cN/dtex or higher, particularly 8 cN/dtex or higher, for example 9 cN/dtex or higher, and further 10 cN/dtex or higher. The upper limit value of the average fiber strength of the fiber in the present invention is appropriately set depending on the type of the fiber, and the upper limit value is, for example, 30 cN/dtex or lower. The average fiber strength is a value measured by the method described in the Examples mentioned later.

The fibers in the present invention may be inorganic fibers or organic fibers. The fibers in the present invention are preferably alkali-resistant fibers in terms of chemical durability against cement alkali in the roof tile. Examples of the alkali-resistant inorganic fibers include an alkali-resistant glass fiber, a steel fiber, a stainless fiber, a carbon fiber, a ceramic fiber and an asbestos fiber. Examples of the alkali-resistant organic fibers include a polyvinyl alcohol (hereinafter sometimes referred to as PVA)-based fiber (Vinylon fiber etc.), a polyolefin-based fiber (polyethylene fiber, polypropylene fiber, ethylene/propylene copolymer fiber, etc.), ultrahigh molecular polyethylene fiber, a polyamide-based fiber (polyamide 6, polyamide 6,6, polyamide 6,10, etc.), an aramid fiber (especially para-aramid fiber), a polyparaphenylene benzobisoxazole-based fiber (PBO fiber), an acrylic fiber, a rayon-based fiber (polynosic fiber, solvent-spun cellulose fiber, etc.), a polyphenylene sulfide fiber (PPS fiber), a polyetheretherketone fiber (PEEK fiber), and the like. These alkali-resistant fibers may be used alone or in combination of two or more.

Among them, in view of reinforcing performance for the roof tile and low-cost production process, the alkali-resistant fibers are preferably at least one selected from the group consisting of an alkali-resistant glass fiber, a carbon fiber, a polyvinyl alcohol-based fiber (Vinylon fiber, etc.), a polyolefin-based fiber (polyethylene fiber, polypropylene fiber, ethylene/propylene copolymer fiber, etc.), an acrylic fiber and an aramid fiber, are more preferably at least one selected from the group consisting of a polyvinyl alcohol-based fiber, polyethylene fiber, polypropylene fiber, an acrylic fiber and an aramid fiber, and are further preferably a polyvinyl alcohol-based fiber. The polyvinyl alcohol-based fiber may be a fiber spun by a wet method, a dry-wet method, or a dry method using a spinning dope obtained by dissolving a polyvinyl alcohol-based polymer in a solvent.

In the case that a molding material which has a lot of free water and which easily flow, such as ordinary mortar or concrete, is to be reinforced, in general, thick fibers are suitable for improving dispersibility of the fibers and moldability, but in that case, the adhesiveness of the fibers is low and the reinforcing performance is inferior since their specific surface area is small. On the other hand, thinner fibers are preferable for increasing the adhesiveness of the fibers to obtain reinforcing performance, but it is very difficult to disperse the fibers in ordinary mortar and concrete, and if mixing is forcedly conducted, the fibers are damaged and the reinforcing performance therefore becomes insufficient. Thus, there is a trade-off relationship between reinforcing performance and moldability. In the present invention, since the fibers exhibit high dispersibility while exhibiting high reinforcing performance for the roof tile, it is possible to obtain a roof tile having a high strength and a high lightweight property by using the fibers.

In the present invention, a content of the fibers in the roof tile may be appropriately set depending on the type, the average fiber diameter, the aspect ratio and the like of the fibers, but is preferably from 0.1 to 2% by weight, more preferably from 0.2 to 1.8% by weight and further preferably from 0.3 to 1.5% by weight, relative to the total weight of the roof tile. When the content of the fibers is within the above range, the reinforcing effect due to the fibers is further enhanced and simultaneously the number of a fiber having a buckled portion and the number of a buckled portion per fiber can be suppressed, and the reinforcing effect due to the fibers can be further improved.

(Cement)

Examples of the cement in the present invention include portland cement such as ordinary portland cement, high early strength portland cement, ultrahigh early strength portland cement and moderate heat portland cement; alumina cement; blast furnace cement; silica cement; and fly ash cement. These cements may be used alone or in combination of two or more.

(Fine Aggregate)

The fine aggregate may be a fine aggregate having an average particle diameter of 5 mm or less, for example from 0.1 to 5 mm, and preferably from 0.2 to 4 mm. Examples thereof include sands having a particle diameter of 5 mm or less; fine aggregates obtained by pulverizing or granulating an inorganic material such as ash stone, fly ash, blast furnace slag, volcanic ash type shirasu (a type of light gray volcanic ash), various sludge, rock minerals, and the like. These fine aggregates may be used alone or in combination of two or more. Examples of the sands include river sand, mountain sand, sea sand, crushed sand, silica sand, slag, glass sand, iron sand, ash sand, calcium carbonate, artificial sand and the like. These fine aggregates may be used alone or in combination of two or more.

The ratio of the fine aggregate to the cement in the molding material, S/C (sand cement ratio), is usually from 0.1 to 10, and preferably from 0.5 to 5.

The roof tile in the present invention may comprise a lightweight aggregate. Examples of the lightweight aggregates include natural lightweight aggregates such as volcanic gravel, expanded slag, and coal shells; and artificial lightweight aggregates such as foamed pearlite, foamed perlite, foamed obsidian, vermiculite, and shirasu balloon. Since the roof tile in the present invention can maintain its strength even when it is made thin, it is possible to reduce the weight of the roof tile while reducing the amount of lightweight aggregate which easily crushes during the production process. Therefore, it is possible to reduce a ratio of the lightweight aggregate based on the whole aggregate to 10% by weight or less, and preferably 5% by weight or less.

The roof tile in the present invention may comprise a functional aggregate in addition to the fine aggregate. Examples of the functional aggregate include a colored aggregate, a hard aggregate, an aggregate having elasticity, and an aggregate having a specified shape. Specific examples thereof include layer silicate (for example, mica, talc, and kaolin), alumina, silica and the like. The ratio of the functional aggregate to the fine aggregate may be appropriately set depending on the types of the individual aggregates. For example, the weight ratio of the fine aggregate to the functional aggregate [(fine aggregate)/(functional aggregate)] may be from 99/1 to 70/30, preferably from 98/2 to 75/25, and more preferably from 97/3 to 80/20. These functional aggregates may be used alone or in combination of two or more.

Among them, layer silicate is preferable as the functional aggregate. The layer silicate may have a flake diameter of, for example, from 10 to 800 μm, and preferably from 20 to 700 μm. For example, main components of mica, which is one type of layer silicate, are $SiO_2$, $Al_2O_3$, $K_2O$ and crystal water. Examples of preferred mica include muscovite (white mica), phlogopite (bronze mica) and the like.

The weight average flake diameter of the layer silicate may be, for example, from 50 to 800 μm, and preferably from 100 to 700 μm. The weight average flake diameter can be determined by classifying layer silicate with standard sieves having various opening sizes, plotting the results on a Rosin-Rammlar diagram, measuring an opening size when 50% by weight of the layer silicate is passed, and multiplying the opening size by square root of two (length of diagonal of square). By combining the layer silicate with the fibers, it is possible to reinforce each other so as to improve various strength properties of the roof tile.

The ratio of the functional aggregate (in particular, layer silicate) to the fibers can be appropriately set depending on each of the types of the functional aggregate and the fibers. For example, the weight ratio of the functional aggregate to the fibers ([functional aggregate]/[fiber]) may be from 1/1 to 50/1, preferably from 2/1 to 40/1, and more preferably from 3/1 to 30/1.

The weight ratio (aggregate (S)/cement (C)) of the total amount of the aggregate (S) to the cement (C) may be from 1/10 to 5/1, preferably from 1/8 to 4/1, and more preferably from 1/6 to 3/1. The total amount of the aggregate (S) means a total amount of the fine aggregate, lightweight aggregate and functional aggregate.

The roof tile in the present invention may optionally comprise various admixtures if necessary. Examples of the admixtures include an AE agent, a fluidizer, a water reducing agent, a high performance water reducing agent, an AE water reducing agent, a high performance AE water reducing agent, a thickener, a water retention agent, a water repellent agent, a swelling agent, a hardening accelerator, a retarder, a polymer emulsion [acrylic emulsion, ethylene-vinyl acetate-based emulsion, and SBR (styrene butadiene rubber)-based emulsion], and the like. The admixture may be contained alone or in combination of two or more. The polymer emulsion not only can enforce the brittleness of the roof tile, but also can enforce the adhesion between each of the components in the roof tile. In addition, it is possible not only to improve the water permeation preventing property of the roof tile but also to suppress excessive drying, by combining the polymer emulsion.

The roof tile in the present invention may also comprise a water-soluble polymeric substance, if necessary. Examples of the water-soluble polymeric substance include cellulose ethers such as methylcellulose, hydroxymethylcellulose, hydroxyethylcellulose, carboxymethylcellulose, hydroxypropylmethylcellulose; polyvinyl alcohol; polyacrylic acid; lignin sulfonate; and the like. The water-soluble polymeric substances may be used alone or in combination of two or more.

The roof tile in the present invention can be obtained by mixing a molding material with water and hardening the mixture, the molding material comprising the fibers and the cement, as well as optionally the fine aggregate, and various admixtures unless the effect of the present invention is impaired.

The roof tile in the roof tile may have an upper surface (top surface) hardened by non-mold shaping, a lower surface (bottom surface) hardened by mold shaping, and side surfaces, and wherein the roof tile may have a cut end surface on at least one of the side surfaces. This roof tile is produced by a roller/slipper type system, for example. According to this system, the roof tile in the present invention can be efficiently produced, and it is therefore possible to obtain a roof tile having a high strength and a lightweight property as well as having high cost performance.

Figure 2:
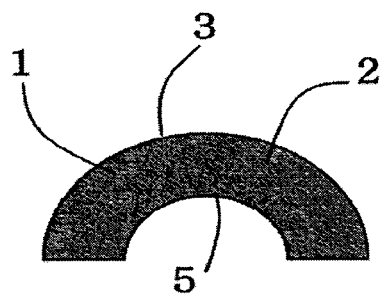
FIG. 2 is a schematic front illustration of a roof tile according to one embodiment of the present invention.

Specifically, as shown in FIG. 2, the roof tile according to one embodiment of the present invention has a roof tile main body part 2 having a semi-tubular shape, and the roof tile main body part 2 has an upper surface 3, a lower surface 5, and a cut end surface 1 as a side surface. The upper surface 3 is a roof tile surface hardened by non-mold shaping, and for example, the upper surface 3 is compressed and shaped by a forming roller and a slipper. The lower surface 5 is a roof tile surface hardened by mold shaping, and for example, the lower surface 5 is shaped by a mold referred to as a pallet in a roller/slipper type system. FIG. 2 is a schematic front illustration for explaining the roof tile according to one embodiment of the present invention.

The cut end surface 1, which is formed by cutting treatment in the production process of the roof tile in the present invention, may have a rough surface shape derived from the cutting treatment at least on a part of the cut end surface. In more detail, the rough surface shape is a rough shape formed by cutting (that is, push-cutting) the molding material, for example by means of cutting means having a blunt end, and such a rough surface shape is mainly formed by aggregation of the molding material when the molding material is compressed at the cut surface. A convex part derived from the fiber agglomerate described later is not completely integrated with surrounding molding material, and exists as a hardened product having at least a part of void between the convex part and the surrounding molding material. Thus, it is possible to visually distinguish the rough surface shape from the convex part derived from the fiber agglomerate.

Figure 3:
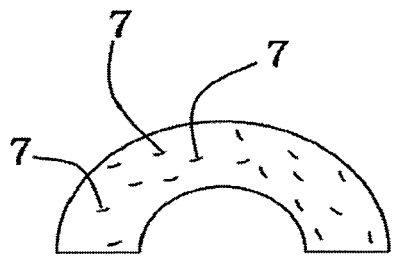
FIG. 3 is a schematic cross-sectional illustration of the roof tile shown in FIG. 2.

As shown in FIG. 3, inside the roof tile in the present invention, the fibers 7 are sufficiently uniformly dispersed. Specifically, the content of a fiber agglomerate having an equivalent circle diameter of 3 mm or more (sometimes referred to simply as "fiber agglomerate") is preferably 25% by weight or less, and particularly from 0.01 to 25% by weight, relative to the total content of the fibers. In terms of further improvement of the strength and appearance, the content of the fiber agglomerate is more preferably from 0.01 to 10% by weight, and further preferably from 0.05 to 5% by weight. If the content of the fiber agglomerate is too large, the strength is lowered and additionally the appearance defect based on the convex part derived from the agglomerate formed on the surface occurs. FIG. 3 is a schematic cross-sectional illustration for explaining the roof tile in the present invention.

In this specification, the fiber agglomerate having an equivalent circle diameter of 3 mm or more means an agglomerate in which an equivalent circle diameter of projected area based on an outermost contour of the fiber agglomerate is 3 mm or more. The equivalent circle diameter means a diameter of a circle having the same area as the projected area based on the outermost contour. As described in detail later, the content of such a fiber agglomerate is determined by dissolving the roof tile, taking out all of the fibers therefrom, and calculating a value from the total weight of the fibers and the weight of the fiber agglomerate.

In the present invention, in terms of further suppressing formation of the fiber agglomerate and further improving the strength and appearance, a CV value as dispersion variance of the fibers may be 35% by weight or less, particularly from 0.01 to 35% by weight, and more preferably from 0.05 to 15% by weight.

As dispersion variance of the fibers, a CV value (variation) of the fiber content in a divided roof tile cut piece is employed, and can be measured by the method described in detail later.

When the molding material introduced into the pallets is push-cut by cutting means such as a blade described later, the cutting means may not necessarily have a sharp blade. Thus, the fibers comprised in the roof tile main body part may not be cut at the time of push-cutting the molding material, and may be pulled out from the inside by the pressure. In this case, at least a part of the fibers may be present on the cut end surface.

The roof tile in the present invention may have a convex part derived from the aggregate inside the roof tile and a convex part formed for the purpose of design. However, in terms of design and reinforcing performance, it is preferable that a surface part of the roof tile main body part 2 (for example, the upper surface 3 and/or the lower surface 5, preferably the upper surface 3, of the roof tile main body part 2) has no convex part derived from the fiber agglomerate in which the fibers get agglomerated in the sphere shape or the like. When the presence or absence of the convex part derived from the fiber agglomerate in the roof tile is to be evaluated, the surface part of the roof tile main body part except the cut end surface may be evaluated so as to clearly distinguish it from the rough surface shape formed on the cut end surface.

The convex part derived from the fiber agglomerate can be confirmed by observing the presence or absence of the fiber agglomerate having an equivalent circle diameter of 3 mm or more (preferably 5 mm or more, particularly 10 mm or more) in the convex part, when the roof tile is cut at a surface comprising the convex part. The convex part derived from the fiber agglomerate is not completely integrated with the surrounding molding material, and exists as a hardened product having at least a part of void between the convex part and the surrounding molding material. Thus, it is possible to visually distinguish the rough surface shape from the convex part derived from the fiber agglomerate. The equivalent circle diameter is a diameter of a circle having the same area as the projected area of the particle (agglomerate), and is sometimes referred to as Heywood diameter. The surface part of the roof tile main body part refers to a part which is not designed to have a protruding part.

In addition, as shown in FIG. 3, inside the roof tile main body part, the fibers 7 wholly exist in a specific state in the thickness direction, that is, in a state that the content of the agglomerate is within the above range. For example, the fibers may be randomly dispersed in the thickness direction inside the roof tile main body part or may be dispersed in a state having orientation in a certain direction, or the random dispersion and the orientation dispersion may coexist in part. In terms of improving bending reinforcing performance, it is preferable that the fibers are orientated in the running direction of the roller/slipper type system.

The shape of the roof tile in the present invention is not particularly limited, and may be a known shape used in the art such as S shape, tubular shape, semi-tubular shape, corrugated shape, F shape, flat shape, J shape, beaver shake or the like, and may be appropriately selected depending on the application.

Figure 4:
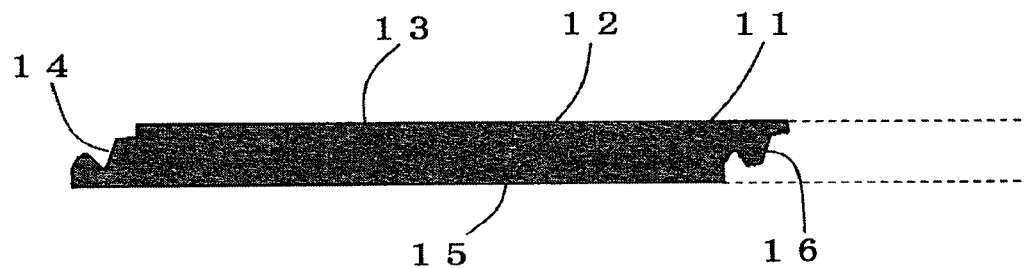
FIG. 4 is a schematic front illustration of a roof tile according to another embodiment of the present invention.

The roof tile may have an overlapping part (or a connecting part) for an adjacent roof tile at one side edge part on its upper surface, and may have an overlapped part (or a connected part) for an adjacent roof tile at the other side edge part on its lower surface. For example, FIG. 4 is a schematic front illustration for explaining a roof tile in the present invention, which is an F-shaped roof tile. This roof tile has an approximately square shaped roof tile main body part 12 having a cut end surface 11 on at least one side thereof, an overlapping part 14 provided on the upper surface 13 of the roof tile main body part 12, and an overlapped part 16 provided on the lower surface 15 of the roof tile main body part 12. In addition, the cut end surface 11 formed by cutting treatment at the time of production of the roof tile has a rough surface shape derived from the cutting treatment on its cut end surface.

The overlapping part 14 has a groove for engaging with the overlapped part 16, and the overlapped part 16 has a shape obtained by reversing the shape of the groove in the overlapping part 14. In FIG. 4, adjacent roof tiles are indicated by dashed lines, and the overlapping part 14 may overlap with the overlapped part of the adjacent roof tile without any substantial gap. The state in which the overlapping part may overlap with the overlapped part of the adjacent roof tile without any substantial gap means a state in which the overlapping part and the overlapped part are engaged with each other without having a gap of 10 mm or more. The detailed evaluation method is described in the Examples mentioned later. Depending on the design of the roof tile main body part, the overlapping part and the overlapped part are thin compared with the roof tile main body part, and are therefore prone to have thickness unevenness.

Since the roof tile in the present invention comprises the fibers in a sufficiently homogeneously dispersed state as described above, the roof tile has a high bending strength in spite of being lightweight. A 30 mm×150 mm cut piece of the roof tile has a bending strength of preferably 5 N/mm$^2$ or higher, more preferably 5.5 N/mm$^2$ or higher, further preferably 6 N/mm$^2$ or higher, particularly preferably 6.5 N/mm$^2$ or higher, especially preferably 7 N/mm$^2$ or higher, and very preferably 8 N/mm$^2$ or higher. When the bending strength of the 30 mm×150 mm cut piece is not less than the above-mentioned lower limit value, it is possible to obtain a roof tile having a high bending strength while being lightweight. The upper limit value of the bending strength of the 30 mm×150 mm cut piece is not particularly limited, but the upper limit value is, for example, 20 N/mm$^2$ or lower. The bending strength can be measured by the method described in the Examples mentioned later.

The roof tile in the present invention preferably has a high strength, and it is preferable to pass EN 490 standard in a roof tile bending test carried out according to EN 491:2011. In this case, "passing the roof tile bending test" means that, in the load test carried out according to EN 491:2011, the roof tile strength is 1200 N or higher (preferably 1500 N or higher, and more preferably 1800 N or higher) in the case of a flat roof tile. The upper limit value in the roof tile bending test is not particularly limited, but the upper limit value is often about 4000 N. The value in the roof tile bending test refers to a value measured by the method described in the Examples mentioned later.

The roof tile in the present invention can be made thin since the roof tile has a high strength. For example, the thickness of the thinnest part in the roof tile main body part may be, for example, from 6 to 100 mm (for example, from 8 to 100 mm), more preferably from 7 to 95 mm (for example, from 10 to 95 mm), and further preferably from 8 to 90 mm (for example, from 15 to 90 mm).

In addition, since the roof tile in the present invention can maintain its strength even when it is made thin, the roof tile does not necessarily have a small specific gravity, and the weight of the roof tile can be reduced. For example, the roof tile in the present invention may have a specific gravity of from 1.5 to 2.2, preferably from 1.6 to 2.1, and more preferably from 1.7 to 2.0. The specific gravity means a comparison value of a weight of 1 cubic centimeter, when a weight of 1 cubic centimeter of water at 4° C. is referred to as "1".

The roof tile in the present invention is useful as a lightweight roof tile and the like, and for example, its weight may be 40 kg/m$^2$ or less (for example, from 15 to 38 kg/m$^2$), and preferably 37 kg/m$^2$ or less (for example, from 20 to 36 kg/m$^2$).

The weight of the roof tile represents a weight per unit area of the roof tile itself, and is essentially a value obtained by measuring an area and a weight per one piece of the roof tile and dividing the weight by the area.

The roof tile in the present invention preferably has a high toughness, and it is preferable that the roof tile is not substantially broken and divided in a falling ball test carried out according to JIS A1408. The term "not substantially broken and divided" means that the roof tile is not completely broken and divide into two or more large fragments (a volume of at least one fragment is 20% to 80% of the volume of the whole roof tile before the breakage), and the term "broken and divided" does not include surface breakage due to crack failure or loss of a small fragment due to crack of the surface.

At the cut end surface of the roof tile in the present invention, at least a part of the fibers may appear from inside.

(Process for Producing Roof Tile)

As to a process for producing the roof tile according to the present invention, the roof tile can be produced by, for example, a roller/slipper type system, a press type system or a vacuum extrusion forming. Among them, the roller/slipper type system is preferable since it is possible to efficiently produce the roof tile in the present invention as well as to obtain a roof tile which has a high strength and a high lightweight property and additionally has high cost performance.

In the roller/slipper type system, the roof tile in the present invention can be produced by a process comprising:

a preparation step of adding fibers into a mixture comprising cement, a fine aggregate and water at an addition rate of 5 kg/sec or less per ton of solid content of the mixture and simultaneously dispersing the fibers to obtain a molding material;

a supplying step of supplying the molding material into a hopper of a roller/slipper type extrusion device;

a filling step of filling a plurality of adjacent pallets with the supplied molding material from a lower side of the hopper;

a compressing step of compressing the molding material with a roller and a slipper to form a continuous band on the pallets;

a cutting step of cutting the band with a cutting blade to form individual unhardened roof tiles on the individual pallets; and a hardening step of hardening the unhardened roof tiles.

Figure 5:
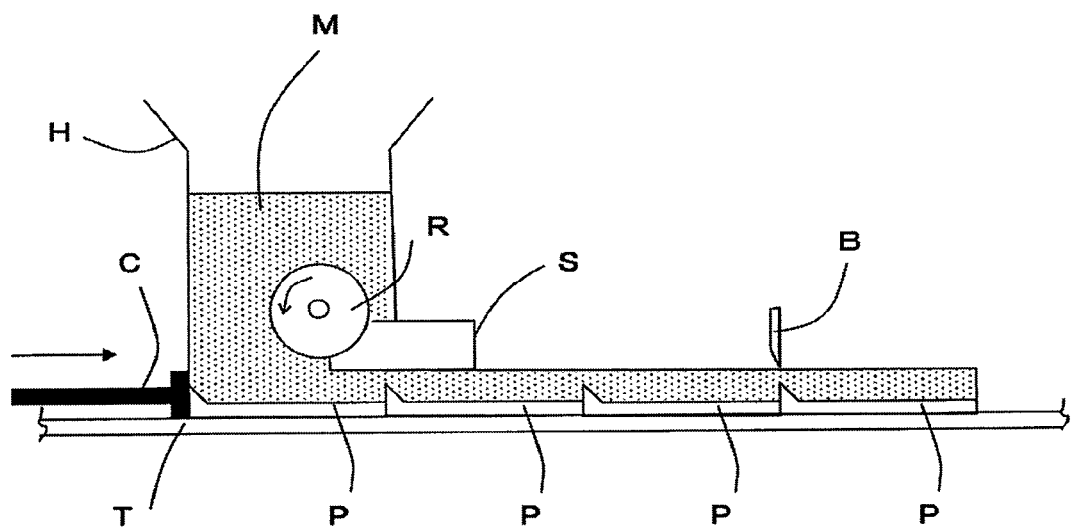
FIG. 5 is a schematic illustration for explaining a process for producing a roof tile according to one embodiment of the present invention.

The process for producing the roof tile in the present invention will be described with reference to FIG. 5. The extrusion device used in the roller/slipper type system comprises a hopper H for supplying a material, an oil hydraulic cylinder C for pushing out pallets P, a roller R for pushing out the material downward from the hopper H and for compressing the material onto the pallets, and a slipper S for further compressing the material pushed out by the roller R.

(1) Preparation Step;

In this step, the fibers are added into a mixture comprising cement, a fine aggregate and water at a certain addition rate and simultaneously dispersed so as to obtain a molding material.

In the preparation step, the mixture comprising cement, a fine aggregate and water is first prepared. The mixture, into which the fibers are added, usually comprises all of the components except the fibers, and the mixture comprises at least cement, a fine aggregate and water. The mixing order of the cement, fine aggregate and water is not particularly limited. The mixture may comprise the total amount of the cement, fine aggregate, and water to be used from the beginning, or may comprise a part of the cement, fine aggregate, and water to be used from the beginning. For example, when the mixture comprises a part of the cement, fine aggregate and water, the remainder may be added during and/or after dispersion of the fibers. As to mixing, for example, the cement, fine aggregate and water may be mixed, and for example, water may be added and mixed after the cement and fine aggregate are dry-mixed.

Then, the fibers are added into the mixture and simultaneously dispersed to obtain the molding material M. The addition rate of the fibers at this time is preferably 5 kg/sec or less, particularly from 0.01 to 5 kg/sec, more preferably from 0.01 to 4.5 kg/sec, further preferably from 0.01 to 4.0 kg/sec, particularly preferably from 0.01 to 2 kg/sec, and especially preferably from 0.1 to 2 kg/sec, per ton of solid content of the mixture. When the fibers are added into the mixture at the addition rate of the above upper limit value or less, the homogeneous dispersibility of the fibers is remarkably improved so that formation of the fiber agglomerate is suppressed and the roof tile therefore has a sufficiently improved strength and appearance. In the prior art, all of the fibers are added together, and even if the fibers are added continuously, the addition rate of the fibers is usually 20 kg/sec or more per ton of solid content of the mixture, and even if the addition rate is set to be slow, the addition rate is from 10 to 15 kg/sec. When such an addition rate in the prior art is employed, uniform dispersibility of the fibers is lowered and the fiber agglomerate is formed. As a result, the roof tile has a decreased strength and appearance.

The description with respect to the addition rate "per ton of solid content of the mixture" means that the addition rate varies depending on the amount of solid content of the mixture. For example, the lower the solid content of the mixture is, the lower the addition rate is set. Specifically, the addition rate of 5 kg/sec or less per ton of solid content of the mixture means, for example, an addition rate of 8.5 kg/sec or less when the solid content is 1.7 ton, and for example, an addition rate of 0.35 kg/sec or less when the solid content is 70 kg.

It is preferable to continuously add the fibers at a constant rate. The addition duration time from the start of the addition to the completion is not particularly limited, but is preferably 3 seconds or longer, especially from 3 to 30 seconds, and more preferably from 5 to 20 seconds, in terms of further suppressing formation of the fiber agglomerate.

In the preparation step, the mixing ratio of water to cement in the mixture is appropriately adjusted depending on the composition of the mixture and the like, but the water/cement ratio (W/C) is preferably from 20 to 50% by weight, more preferably from 25 to 45% by weight, and further preferably from 30 to 40% by weight.

In the present invention, it is possible to introduce the fibers under a small water/cement ratio (W/C). Conventionally, under a small water/cement ratio (W/C), the state after mixing lacks flowability, and therefore, even if the fibers are introduced, it is impossible to uniformly mix the fibers in the molding material M to increase the strength of the roof tile. In addition, even if an admixture is used, the flowability is lower than that of mortar and concrete obtained for ordinary casting molding, and it is difficult to uniformly mix the fibers. On the other hand, when the fibers defined in the present invention are used, it is possible to uniformly disperse the fibers even under a small water/cement ratio (W/C) to obtain a roof tile having a high strength.

For example, in order to improve the dispersibility of the fibers, (i) the fibers may be supplied in a quantitative way, (ii) the fibers in the disaggregated state may be added, and (iii) a mixer or a kneader having a high stirring performance may be used when the fibers are mixed. These methods (i) to (iii) may be carried out alone or in combination of two or more.

When the fibers are supplied in a quantitative way, there is no particular limitation as long as the fibers can be continuously supplied in the defined amount range. For example, various quantitatively supplying devices (for example, vibrating feeder, screw feeder, belt feeder, and the like) can be used as a device for supplying the fibers while controlling the supplied amount and/or addition rate of the fibers.

When the fibers are disaggregated, for example, the fiber agglomerate can be disaggregated to a smaller fiber agglomerate unit by certain disaggregating means or the like, so that generation of the fiber agglomerate in the molding material can be suppressed. When the fiber agglomerate is disaggregated, in terms of maintaining the fiber strength, the disaggregation treatment is preferably carried out so that fibrillation of the fibers, pulverization of the fibers, and formation of the buckled portion do not occur.

The fiber agglomerate can be usually disaggregated in various methods in dry form. For example, the fiber agglomerate (fiber bale, roughly fibrillated product of the fiber bale, short cut fiber bundle, and the like) may also be disaggregated by a method of hooking the fibers on a roll having protrusions, a method of passing the fibers between facing rotation gears, a method of using a shearing force of a rotary disk having a groove, or a method of using a collision force of air flow. These methods may be carried out alone or in combination of two or more. For example, the fiber agglomerate (for example, a mass of short cut fiber which is cut to a certain length) may be disaggregated in a dry form to separate the fibers from each other for disaggregation of the fiber agglomerate.

When adding the fibers, it is preferable to disperse the fibers under agitation of the mixture. As to the dispersion method of the fibers, the dispersion of the fibers may be carried out by various methods. For example, when a mixer or a kneader having a high stirring performance is used, examples of the mixer or kneader having a high stirring performance include a double arm kneader, a pressure kneader, an Eirich mixer, a super mixer, a planetary mixer, a Banbury mixer, a continuous mixer, a continuous kneader, and the like. Preferably, a planetary mixer or an Eirich mixer is used.

For example, in the case of a planetary mixer, its rotation speed is preferably from 30 to 400 rpm and particularly preferably from 40 to 350 rpm, and its revolution speed is preferably from 10 to 200 rpm and particularly preferably from 15 to 180 rpm, in terms of further suppressing formation of the fiber agglomerate.

In terms of further suppressing formation of the fiber agglomerate, it is preferable to subject the fibers to disaggregation treatment before addition to the mixture. The disaggregation treatment is a treatment for separating the fibers from each other to promote formation of single fibers by disaggregating a bundle of the fibers.

The disaggregation treatment can be usually carried out in various methods in dry form. For example, examples thereof include at least one treatment selected from the group consisting of a treatment of passing the fibers between facing rotation gears to disaggregate the fibers; a treatment of hooking the fibers on a roll having protrusions to disaggregate the fibers; a treatment of disaggregating the fibers by a shearing force of a rotary disk having a groove; and a treatment of disaggregating the fibers by a collision force of air flow. Preferable is a treatment of passing the fibers between facing rotation gears to disaggregate the fibers.

In the treatment of passing the fibers between facing rotation gears to disaggregate the fibers, when the fibers are passed through a clearance between the gears, the fibers are disaggregated by the rotational force of the gears.

In the treatment of hooking the fibers on a roll having protrusions to disaggregate the fibers, the fibers are hooked with the protrusions of the rotating roll and carded so that the fibers can be disaggregated.

In the treatment of disaggregating the fibers by a shearing force of a rotary disk having a groove, the fibers can be disaggregated while being drafted in the bias direction, by interaction of the fibers and, a sawtooth blade of a rotor having a groove and a stator.

In the treatment of disaggregating the fibers by a collision force of air flow, when the fibers are introduced, the fibers can be disaggregated by applying compressed air through an air nozzle. The air is not particularly limited as long as the air is applied from at least one direction.

In the molding material obtained in the preparation step, it is preferable to achieve the certain content of the fiber agglomerate having an equivalent circle diameter of 3 mm or more, which is defined in the roof tile in the present invention. If the certain content of the fiber agglomerate is not achieved in the molding material, the certain content of the fiber agglomerate cannot be achieved also in the roof tile in the present invention. The content of the fiber agglomerate in the molding material can be measured by the same method as the method for measuring the content of the fiber agglomerate in the roof tile.

In the molding material obtained in the preparation step, it is preferable to achieve the dispersion variance (CV value) of the fibers which is preferably achieved in the roof tile in the present invention. Instead of measuring the fiber ratio in the cut piece obtained by cutting of the roof tile or the like, the dispersion variance (CV value) of the fibers in the molding material can be measured by the same method as the method for measuring the dispersion variance (CV value) of the fibers in the roof tile except that 50 samples are taken out at random from the molding material, and that the fiber ratio and the like in the samples are measured.

(2) Supplying Step;

In the supplying step, the molding material M obtained in the preparation step is supplied into the hopper H of the roller/slipper type extrusion device. FIG. 5 is a conceptual diagram of the roller/slipper type extrusion device. The extrusion device used in the roller/slipper type system comprises a hopper H for supplying a material, an oil hydraulic cylinder C for pushing out pallets P, a roller R for pushing out the material downward from the hopper H and for compressing the material onto the pallets, and a slipper S for further compressing the material pushed out by the roller R.

(3) Filling Step;

In the filling step, the supplied molding material M is introduced into a plurality of adjacent pallets P from a lower side of the hopper H. Specifically, as shown in FIG. 5, a series of pallets P, each of which is a mold for a shape of a roof tile back surface (roof tile bottom), are arranged in a line under the hopper H, and these pallets are slid and conveyed on a Table T. The table T has guides for moving a series of pallets P on its bottom and side surfaces. The extrusion device has the oil hydraulic cylinder C for pushing out a series of pallets P, each of which is a mold for a shape of a roof tile back surface. After an end of one stroke, the oil hydraulic cylinder C temporarily stops and then returns to the initial position, and it therefore moves in the direction opposite to the arrow direction.

The oil hydraulic cylinder C pushes out the pallets P toward the downstream, where the hopper H is referred to as the upstream, by action in the direction of the arrow, and as the pallets P are conveyed, the molding material M is pushed out from a lower side of the hopper and introduced into the pallets P.

(4) Compressing Step;

In the compressing step, the introduced molding material M is compressed with a roller and a slipper to form a continuous band on the pallets P. Specifically, as shown in FIG. 5, the molding material M introduced into the pallets P in the filling step is compressed with the roller R and the slipper S to form a band. The oil hydraulic cylinder C pushes out the pallets P toward the downstream, where the hopper H is referred to as the upstream, by action in the direction of the arrow. As the pallets P are conveyed, the molding material M introduced into the pallets P is leveled and compressed by the roller R and the slipper S to form a continuous band on the pallets P and simultaneously form a top surface of the roof tile (or an upper surface of the roof tile).

In more detail, the molding material M in the hopper H is introduced into the pallets P by its own weight and by rotation of the roller R in the direction of the arrow and the like, and the molding material M introduced into the pallets P is compressed by the roller R and the slipper S to form the top surface of the roof tile (or the upper surface of the roof tile), and thus, the filling step and compressing step are integrally carried out. In the hopper H, there may optionally be extruding means for extruding the molding material M in the direction of the pallets P (for example, a paddle or the like).

The filling step and the compressing step may be carried out under heating, and the roller R and the slipper S may be heated if necessary. The heating temperature is preferably about 40 to 90° C., more preferably 45 to 85° C., and further preferably 50 to 80° C.

On the surfaces of the pallets P, the roller R and/or the slipper S which are brought into contact with the molding material M, there may be irregularities for design as appropriate. Due to the irregularities, the shape of the roof tile itself, the shape of the overlapping and overlapped parts of the roof tile, a pattern of the roof tile and the like can be formed.

The roof tile is cured and hardened in a state that the lower surface of the roof tile is in contact with the pallets P. Thus, the roof tile has a lower surface hardened by mold shaping with the pallets P. On the other hand, an upper surface of the roof tile is shaped when compressed with the roller R and/or the slipper S. However, since the upper surface is not shaped with a mold, the upper surface is hardened by non-mold shaping. The surface hardened by mold shaping tends to be a smooth surface due to the shape of the mold.

(5) Cutting Step;

In the cutting step, the band is cut with a cutting blade to form individual unhardened roof tiles (ready-hardened roof tiles) on the individual pallets. Specifically, as shown in FIG. 5, the band, which is continuously formed on the adjacent pallets P, is conveyed to the downstream of the hopper H by the oil hydraulic cylinder C. At the front and rear ends of the pallets P, cutting treatment is carried out with a blade B provided on the downstream side to form individual unhardened roof tiles on the individual pallets P.

(6) Hardening Step;

In the hardening step, the unhardened roof tiles are hardened. Specifically, roof tiles having a desired shape can be obtained by curing the unhardened roof tiles under a certain condition, for example, under an atmosphere of 100° C. or lower so as to harden the unhardened roof tiles. In the cutting treatment with the blade B, the rough surface derived from the cutting treatment is usually formed on the cut end surface of the roof tile.

Figure 6:
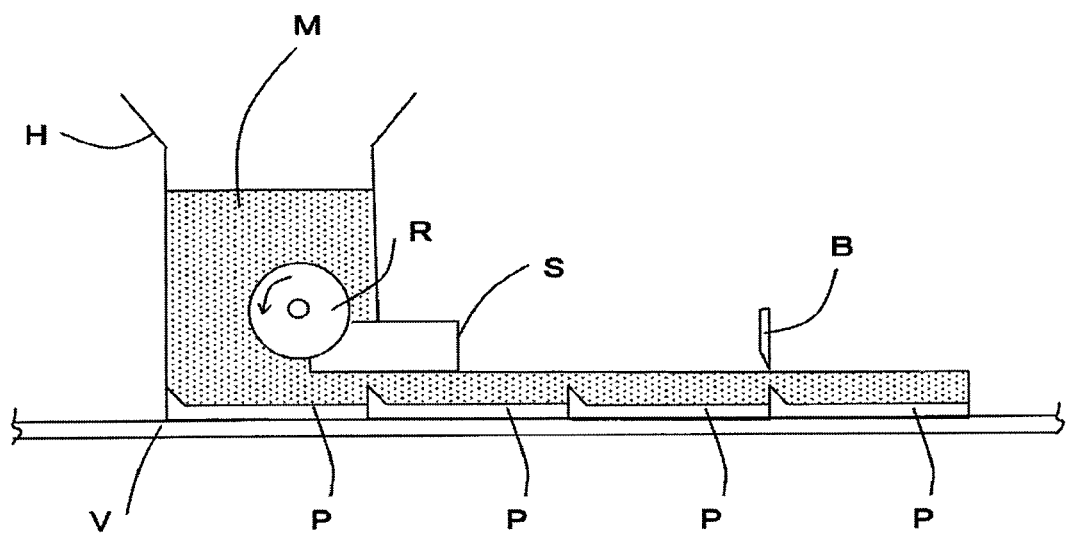
FIG. 6 is a schematic illustration for explaining a process for producing a roof tile according to another embodiment of the present invention.

In addition, the roof tile in the present invention can also be produced by the roller/slipper type extrusion device shown in FIG. 6. A method for producing the roof tile according to another embodiment of the present invention will be described with reference to FIG. 6. In this embodiment, a conveyor V, which has a series of pallets P in a line as molds for shapes of roof tile back surfaces, is provided under the hopper H, instead of the table T shown in FIG. 5.

This conveyor V moves toward the downstream, where the hopper H is referred to as the upstream, and the molding material M is pushed out along with the movement, introduced into the pallets P and compressed with the roller R and the slipper S. In more detail, for example, the molding material M in the hopper H is introduced into the pallets P due to its own weight, rotation of the roller R in the direction of the arrow and the like, and the conveyor V moves to the downstream, where the hopper H is referred to as the upstream, and the molding material M pushed into the pallet P along with the movement is compressed by the roller R and the slipper S, and thereby the surface of the roof tile is formed.

The conveyor V can be moved by various driving means employed in the industry, although the driving means is shown in FIG. 6. For example, the conveyor V may be moved by driving means such as a motor. Furthermore, as long as the pallets P can be moved, the means for moving the pallets P is not particularly limited, and any other means than the exemplified moving means can be used.

The roof tile in the present invention can also be produced by a press type system. In the press type system, the molding material prepared in the same manner as described above can be introduced into a mold and compressed with an upper surface shaping mold, a roll or the like to obtain an unhardened roof tile.

The compression may also be carried out under heating, if necessary. The heating temperature is preferably about 40 to 90° C., more preferably 45 to 85° C., and further preferably 50 to 80° C.

Vibration may also be applied when the molding material is introduced into a mold, if necessary. Vibration is usually applied by vibrating the mold. By applying vibration, it is possible to more uniformly distribute the molding material in the mold.

The frequency of the vibration is preferably from 10 to 1000 Hz, more preferably from 20 to 900 Hz, and further preferably from 30 to 800 Hz. The amplitude is preferably from 0.1 to 20 µm, more preferably from 0.5 to 18 µm, and further preferably from 1 to 15 µm.

The pressure of the compression can be appropriately adjusted depending on the state of the mixed molding material, the form of the mold and the like, and is preferably from 10 to 150 MPa, more preferably from 20 to 140 MPa, and further preferably from 30 to 130 MPa. If the pressure is less than 10 MPa, the integration of the material may be insufficient. If the pressure exceeds 150 MPa, the fibers are damaged by pressing force of the aggregate, and the fiber strength decreases and additionally the durability of the mold may also be impaired.

The compression may also be carried out under heating, if necessary. The heating temperature is preferably from 40 to 90° C., more preferably from 45 to 85° C., and further preferably from 50 to 80° C.

After the shaping to a certain shape, the roof tile in the present invention can be obtained by curing the molding material in an atmosphere of 100° C. or lower.

(Molding Material of Roof Tile)

The molding material for producing the roof tile according to the present invention comprises at least the cement, fine aggregate, fibers and water. In addition, the molding material in the present invention may optionally comprise the lightweight aggregate and functional aggregate. The types, contents and content ratios of the cement, aggregate and fibers are the same as explained above. Furthermore, the molding material in the present invention may comprise the above-mentioned various admixtures.

In the molding material according to the present invention, the water cement ratio (W/C) may be usually from 20 to 50% by weight, preferably from 20 to 45% by weight (for example, from 35 to 45% by weight), and more preferably from 20 to 40% (For example, from 35 to 40%). The above-mentioned content, which is achieved in the roof tile according to the present invention, of the fiber agglomerate having an equivalent circle diameter of 3 mm or more is achieved in this molding material. In addition, the certain dispersion variance (CV value) of the fibers, which is preferably achieved in the roof tile according to the present invention, is preferably achieved in this molding material.

The ratio of the fibers to the solid content of the molding material is preferably from 0.1 to 2% by weight, more preferably from 0.2 to 1.8% by weight, and further preferably from 0.3 to 1.6% by weight, in terms of reinforcing performance and suppression of formation of the fiber agglomerate.

Into the molding material according to the present invention, the fibers can be introduced under a small water cement ratio (W/C).

EXAMPLES

Hereinafter, the present invention will be described in detail with reference to the Examples and Comparative Examples, but the present invention is not limited to the Examples.

[Average Fiber Diameter (µm) and Aspect Ratio]

An average fiber length was determined according to JIS L1015 "Chemical fiber staple test method (8.5.1)", and an aspect ratio of the fiber was determined based on a ratio relative to an average fiber diameter. As to the average fiber diameter, 100 fibers were taken out at random, and for each of the fibers, its fiber diameter at its central portion in the longitudinal direction was measured by an optical microscope, and an average value of the measured values was taken as the average fiber diameter.

[Average Fiber Strength]

According to JIS L1015 "Chemical fiber staple test method (8.5.1)", a fiber was preliminarily placed in an atmosphere of a temperature of 20° C. and a relative humidity of 65% for 5 days to adjust the humidity. Then, the strength of the fiber was measured with FAFEGRAPH M (manufactured by Textechno) at a tension rate of 60 mm/min and a length of the single fiber of 60 mm. The strength of the fiber was divided by its fineness to determine a fiber strength. The fiber strength was measured for 10 or more randomly selected fibers, and an average value of the measured values was taken as the average fiber strength.

[Number of Buckled Portion Present in Fiber]

After a roof tile was immersed in a 5 wt % hydrochloric acid aqueous solution at 20° C. to dissolve cement, 20 fibers were taken out with tweezers. The fibers were immersed in water heated at 80° C. with a dissolved blue dye for 30 minutes and spread on a slide glass so that the fibers did not overlap with each other as much as possible, and then a cover glass was placed thereon to obtain an evaluation sample. As shown in FIG. 1, this evaluation sample was magnified and observed with a video microscope manufactured by KEYENCE Corporation, and a number of colored parts of buckled portions present in all of the fibers was counted. Then, a number of buckled portions per fiber was calculated according to the following formula.

Number of buckled portion present in fiber (/fiber)=Total number of counted buckled portion/20 (fibers)

[Specific Gravity of Roof Tile]

Three cut pieces were cut out from one roof tile, each of the cut pieces having a rectangle shape with a length of about 150 mm and a width of about 50 mm, and the dimensions of each of the cut pieces were measured to determine a volume of each of the cut pieces. Subsequently, after each of the cut pieces was dried in a dryer at 100° C. for 24 hours, its weight was measured. Thereafter, a specific gravity of each of the cut pieces was calculated according to the following formula, and then an average value of the measured values was calculated as the specific gravity of the roof tile.

Specific gravity $(g/cm^3)$=Weight of cut piece (g)/ Volume of cut piece [length×width×height] $(cm^3)$

[Bending Strength of Cut Piece]

From a roof tile, three cut pieces were cut out per roof tile, each of the cut pieces having a rectangle shape with a length of about 150 mm and a width of about 50 mm. Then, in order to adjust the moisture content at the time of measurement of the cut pieces to a constant value, the cut pieces were dried for 72 hours in a dryer adjusted to 40° C. The measurement method of bending strength was according to JIS A1408. The measurement of bending strength was carried out with Autograph AG 5000-B manufactured by Shimadzu Corporation at a test speed (loading head speed) of 2 mm/min with a bending span of 100 mm in a central loading system.

[Method for Measuring Content of Fiber Agglomerate and CV Value of Fiber Content]

As described above, the fiber agglomerate is an agglomerate having an equivalent circle diameter of 3 mm or more.

The equivalent circle diameter can be easily determined by photographing the fiber agglomerate and analyzing the obtained photograph with a computer.

First, the roof tile was cut into pieces having 5 square centimeters, and their weights were measured. If a piece having less than 5 square centimeters was to be formed, cutting treatment was carried out so as to form a piece having a weight close to that of a piece having 5 square centimeters. Subsequently, after the cut pieces were immersed in a 5% hydrochloric acid aqueous solution to dissolve cement, a sieving treatment was carried out so as to separate the fibers. After washing treatment with water and drying treatment, the fiber weight was measured. At that time, when a fiber agglomerate was contained in the separated fibers, only the agglomerate was taken out and the weight of only the agglomerate was also measured. This operation was carried out for all of the cut pieces obtained by cutting the roof tile. Then, as to each of the cut pieces, the fiber ratio (% by weight) for each of the cut pieces was determined by dividing the weight of the fibers contained in the cut piece by the weight of the cut piece. Likewise, the fiber agglomerate ratio (% by weight) for each of the cut pieces was determined by dividing the weight of the fiber agglomerate contained in the cut piece by the weight of the cut piece.

(Content of Fiber Agglomerate)

The average ratio (% by weight) of the fibers contained in the roof tile was determined by dividing the sum of the fiber ratios (% by weight) for all of the cut pieces by the number of the cut pieces. Likewise, the average ratio (% by weight) of the fiber agglomerate contained in the roof tile was determined by dividing the sum of the ratios (% by weight) of the fiber agglomerate for all of the cut pieces by the number of the cut pieces. Then, the content ($F_A$) of the fiber agglomerate was calculated according to the following equation.

Content of fiber agglomerate (%)=[Average ratio of fiber agglomerate (% by weight)/Average ratio of fibers (% by weight)]×100  [Equation 1]

As to the content ($F_A$) of the fiber agglomerate, the case of $F_A$>25% by weight is poor (C), the case of 25% by weight ≥$F_A$>10% by weight is moderate (B) (no practical problem), and the case of 10% by weight ≥$F_A$ is good (A).

(CV Value of Fiber Content)

The standard deviation of the fiber ratio (% by weight) was calculated from the fiber ratios (% by weight) for all of the cut pieces. Then, the CV value of the fiber content was calculated according to the following equation.

CV value of fiber content (%)=[Standard deviation of fiber ratio (% by weight)/Average ratio of fibers contained in roof tile (% by weight)]×100  [Equation 2]

As to the CV value ($F_c$) of the fiber content, the case of $F_c$>35% is poor (C), the case of 35%≥$F_c$>15% is moderate (B) (no practical problem), and the case of 15%≥$F_c$ is good (A).

[Method for Measuring Weight of Roof Tile (kg/m²)]

For each of five roof tiles, the area projected from the upper surface of the roof tile and the weight of the roof tile were measured. The areas and the weights were summed respectively, and the sum of the weights was divided by the sum of the areas to determine the weight of the roof tile (kg/m²).

[Bending Load Measurement Test of Roof Tile]

According to EN 491:2011, a roof tile bending test was carried out at a test speed (loading head speed) of 1500 N/min. The bending load value obtained by this test was evaluated according to the EN 490 standard to determine whether "pass" or not.

[Falling Ball Test of Roof Tile]

With reference to JIS A1408, a falling ball test was carried out in conditions of opposite side simply supported, a span of 200 mm, a ball weight of 1.05 kg, and a drop height of 30 cm. Three samples were tested per level, and if even one sample was substantially divided and broken, the evaluation is taken as "fail". The term "not substantially broken and divided" means that the roof tile is not completely broken and divide into two or more large fragments (a volume of each fragment is 20% or higher of the volume of the whole roof tile before the breakage). The term "broken and divided" does not include surface breakage due to crack failure or loss of a small fragment due to crack of the surface.

The following components were used in the Examples and the Comparative Examples.

(Fiber)

PVA1: Polyvinyl alcohol-based fiber (Vinylon), average fiber diameter 7 μm, manufactured by Kuraray CO., Ltd.

PVA2: Polyvinyl alcohol-based fiber (Vinylon), average fiber diameter 26 μm, manufactured by Kuraray Co., Ltd.

PVA3: Polyvinyl alcohol-based fiber (Vinylon), average fiber diameter 100 μm, manufactured by Kuraray CO., Ltd.

PVA4: Polyvinyl alcohol-based fiber (Vinylon), average fiber diameter 5 μm, manufactured by Kuraray Co., Ltd.

PVA5: Polyvinyl alcohol-based fiber (Vinylon), average fiber diameter 45 μm, manufactured by Kuraray CO., Ltd.

PP: Polypropylene fiber, average fiber diameter 14 μm

Each fiber of PVA1 to PVA5 and PP was cut to have the aspect ratio defined in the Examples and the Comparative Examples, and was used.

(Cement)

Ordinary portland cement, manufactured by Taiheiyo Cement Co., Ltd.

(Fine Aggregate)

No. 6 silica sand (Admixture)

Silica fume (EFACO manufactured by Tomoe Engineering Co., Ltd.), average particle diameter: about 0.1 to 0.2 μm Examples 1 to 6

Ordinary portland cement (33.3 parts by weight), sea sand (63.2 parts by weight) as fine aggregate S1, and mica (weight average flake diameter: 300 μm, 2.5 parts by weight) as functional aggregate S2 were prepared and dry-blended for one minute with a 100 L volume-planetary mixer (TM-100, manufactured by Pacific Machinery & Engineering Co., Ltd.). Subsequently, water was added thereto, and agitation was carried out to obtain a cement-based mixture having a water cement ratio (W/C) of 38%, and an aggregate (S)/cement (C) ratio of 2/1. Then, under agitation of the mixture at a rotation speed of 180 rpm and a revolution speed of 60 rpm, the fiber shown in Table 1, which had been passed between facing rotation gears to carry out disaggregation treatment, was added into the mixture in the added content and addition rate shown in Table 1, and agitation was carried out for two minutes to obtain a molding material. As shown in FIG. 5, this molding material was introduced into a hopper of a roller/slipper type extrusion device and pushed out onto metal pallets for flat roof tiles, and then the material was compressed with a slipper so that the pallets were filled with the molding material. Subsequently, at the front and rear ends of the pallets, cutting treatment was carried out with a cutting blade to produce flat roof tiles which had dimensions of 422 mm×333 mm×about 10 mm and had engagement parts shown in FIG. 4. These roof tiles were moved to a curing vessel and hardened at 50° C. and 100% RH for 18 hours. After the hardening, the roof tiles were removed from the metal pallets and subjected to further curing treatment at 20° C. and 85% RH for 29 days. The properties of the obtained roof tiles are shown in Table 1.

Example 7

Roof tiles were obtained in the same manner as in Example 1 except that the fibers had not been subjected to disaggregation treatment in advance. The properties of the obtained roof tiles are shown in Table 1.

Comparative Example 1

Roof tiles were obtained in the same manner as in Example 1 except that no fiber was used. The properties of the obtained roof tiles are shown in Table 1.

Comparative Example 2

Roof tiles were obtained in the same manner as in Example 1 except that the addition rate of the fibers was changed according to Table 1. The properties of the obtained roof tiles are shown in Table 1.

Appearance evaluation of the roof tiles obtained in Examples 1 to 7 and Comparative Examples 1 to 2 was carried out as follows. The results are shown in Table 1.

(Whether or not Convex Part Exists on Surface)

Whether or not a convex part exists on upper surfaces of 10 roof tiles is visually checked. The number ($N_t$) of a convex part per roof tile is calculated. The case of $N_t \geq 1$ is poor (C), the case of $1 > N_t > 0$ is moderate (B) (no practical problem), and the case of $N_t = 0$ is good (A).

(Engagement State in Overlapping Part)

The overlapping part and the overlapped part are engaged, and the engagement state of the two parts is visually observed. Two roof tiles are used as one set, and a maximum value ($M_L$) of a gap between the two roof tiles is measured from a combination of ten sets of roof tiles. The case of $M_L \geq 10$ mm is poor (C), the case of $10$ mm $> M_L \geq 1$ mm is moderate (B) (no practical problem) and the case of $M_L < 1$ mm is good (A).

TABLE 1

| | Fiber | | | | | | | | |
|---|---|---|---|---|---|---|---|---|---|
| | Type | Disaggregation Treatment | Average Fiber Strength (cN/dtex) | Average Fiber Diameter (μm) | Aspect Ratio | Number of Buckled Portion (/fiber) | Content[1] (wt. %) | Content of Fiber Agglomerate (wt. %) | Fiber Content CV Value (%) |
| Example 1 | PVA1 | Presence | 14.0 | 7 | 571 | 1.3 | 0.8 | 3 | 10 |
| Example 2 | PVA2 | Presence | 12.0 | 26 | 231 | 2.0 | 0.8 | 2 | 11 |
| Example 3 | PP | Presence | 10.5 | 14 | 429 | 0 | 0.8 | 4 | 13 |
| Example 4 | PVA1 | Presence | 14.0 | 7 | 429 | 0.8 | 0.4 | 1 | 9 |
| Example 5 | PVA1 | Presence | 14.0 | 7 | 714 | 1.8 | 1.5 | 12 | 22 |
| Example 6 | PVA1 | Presence | 14.0 | 7 | 900 | 2.3 | 0.8 | 14 | 23 |
| Example 7 | PVA1 | Absence | 14.0 | 7 | 571 | 1.1 | 0.8 | 22 | 33 |
| Comparative Example 1 | — | — | — | — | — | — | — | — | — |
| Comparative Example 2 | PVA1 | Absence | 14.0 | 7 | 571 | 3.2 | 0.8 | 26 | 38 |

| | Fiber | | Roof Tile | | | | | |
|---|---|---|---|---|---|---|---|---|
| | Fiber Addition Rate[2] (kg/sec/t) | Addition Duration Time (sec) | Specific Gravity (g/cm³) | Bending Strength (N/mm²) | Roof Tile Bending Test (EN490) | Falling Ball Test (JIS A1408) | Appearance Surface | Appearance Overlapping Part | Roof Tile Weight (kg/m²) |
| Example 1 | 0.8 | 10.0 | 1.88 | 11.0 | Pass | Pass | A | A | 32 |
| Example 2 | 0.8 | 10.0 | 1.86 | 10.0 | Pass | Pass | A | A | 34 |
| Example 3 | 0.8 | 10.0 | 1.86 | 8.0 | Pass | Pass | A | A | 35 |
| Example 4 | 0.8 | 5.0 | 1.9 | 9.0 | Pass | Pass | A | A | 35 |
| Example 5 | 0.8 | 18.8 | 1.68 | 6.5 | Fail | Pass | B | B | 35 |
| Example 6 | 0.8 | 10.0 | 1.78 | 6.0 | Fail | Pass | B | B | 35 |
| Example 7 | 0.8 | 10.0 | 1.77 | 5.8 | Fail | Pass | B | B | 35 |
| Comparative Example 1 | — | — | 1.93 | 5.0 | Fail | Fail | A | A | 35 |
| Comparative Example 2 | 7.0 | 1.1 | 1.75 | 5.0 | Fail | Pass | C | C | 35 |

[1]Content of the fibers donates a ratio of the fibers to the solid content of the mixture.
[2]Fiber addition rate donates an addition rate per ton of the solid content of the mixture.

Example 8

The above cement (25 parts by weight), No. 6 silica sand (73.3 parts by weight) and silica fume (1 part by weight) were dry-blended for 1 minute using a 100 L volume-planetary mixer (TM-100: manufactured by Pacific Machinery & Engineering Co., Ltd.). Subsequently, water was added thereto, and agitation was carried out for one minute to obtain a cement-based mixture having a water/cement ratio (W/C) of 38% and a fine aggregate (S)/cement (C) ratio of 3/1. Then, 0.7% by weight of fiber PVA1, which had been passed between facing rotation gears to carry out disaggregation treatment, was introduced into the mixture and, agitation was carried out for 2 minutes to obtain a molding material. This molding material was introduced into a hopper of a roller/slipper type extrusion device and pushed out onto metal pallets for flat roof tiles so that the pallets are filled with the molding material, and then the molding material was compressed with a slipper and a roller to form a band. Subsequently, the band was cut at the front and rear ends of the pallets with a cutting blade to produce unhardened flat roof tiles having dimensions of 422 mm×333 mm×about 10 mm. These roof tiles were moved to a curing vessel and hardened at 50° C. and 100% RH for 18 hours. After the hardening, the roof tiles were removed from the metal pallets and subjected to further curing treatment at 20° C. and 85% RH for 29 days. The properties of the obtained roof tiles are shown in Table 2.

Examples 9 and 10

Roof tiles were obtained in the same manner as in Example 8 except that the fibers shown in Table 2 were used as fibers. The properties of the obtained roof tiles are shown in Table 2.

Examples 11 to 13

Roof tiles were obtained in the same manner as in Example 8 except that the fibers shown in Table 2 were used as fibers, and that the fiber content was set to the content shown in Table 2. The properties of the obtained roof tiles are shown in Table 2.

Example 14

Roof tiles were obtained in the same manner as in Example 8 except that the fibers had not been passed between facing rotation gears to carry out disaggregation treatment. The properties of the obtained roof tiles are shown in Table 2.

Comparative Examples 3 to 5

Roof tiles were obtained in the same manner as in Example 8 except that the fibers shown in Table 2 were used as fibers, and that the fiber content was set to the content shown in Table 2. The properties of the obtained roof tiles are shown in Table 2.

Comparative Example 6

Roof tiles were obtained in the same manner as in Example 11 except that the mixing time after the fibers was introduced into the cement-based mixture was set to 13 minutes. The properties of the obtained roof tiles are shown in Table 2.

Appearance evaluation of the roof tiles obtained in Examples 8 to 13 and Comparative Examples 3 to 6 was carried out as follows. The results are shown in Table 2.
(Whether or not Convex Part Derived from Fiber Agglomerate Exists in Surface Part and Overlapping Part)

At each of the surface and overlapping parts of the roof tile main body part, whether or not a convex part derived from a fiber agglomerate was visually checked. In the case that a convex part is present, the roof tile is cut at a surface comprising the convex part, and when a fiber agglomerate having an equivalent circle diameter of 10 mm or more exists inside the convex part, it is evaluated that the convex part is a convex part derived from a fiber agglomerate. As to evaluation criterion, the case that there was even one fiber agglomerate having an equivalent circle diameter of 10 mm or more was poor (C), the case that there was even one fiber agglomerate having an equivalent circle diameter of 3 mm or more and less than 10 mm was moderate (B), and the case that an equivalent circle diameter of the fiber agglomerate was less than 3 mm was good (A). The check of a convex part was carried out using ten randomly selected roof tiles, and if a convex part was confirmed in even one of them, it was considered that a convex part existed.

TABLE 2

| | | | Fiber | | | | | | |
|---|---|---|---|---|---|---|---|---|---|
| | Type | Disaggregation Treatment | Average Fiber Strength (cN/dtex) | Average Fiber Diameter (μm) | Aspect Ratio | Number of Buckled Portion (/fiber) | Content[1] (wt. %) | Content of Fiber Agglomerate (wt. %) | Fiber Content CV Value (%) |
| Example 8 | PVA1 | Presence | 14.0 | 7 | 571 | 0.9 | 0.7 | 2 | 13 |
| Example 9 | PVA2 | Presence | 12.0 | 26 | 231 | 2.1 | 0.7 | 2 | 13 |
| Example 10 | PP | Presence | 10.5 | 14 | 429 | 0 | 0.7 | 4 | 15 |
| Example 11 | PVA1 | Presence | 14.0 | 7 | 714 | 1.1 | 0.3 | 1 | 10 |
| Example 12 | PVA1 | Presence | 14.0 | 7 | 571 | 0.9 | 1.8 | 13 | 24 |
| Example 13 | PVA2 | Presence | 12.0 | 26 | 231 | 2.1 | 2.5 | 20 | 30 |
| Example 14 | PVA1 | Absence | 14.0 | 7 | 571 | 1.0 | 0.7 | 5 | 16 |
| Comparative Example 3 | PVA3 | Presence | 10.0 | 100 | 120 | 4.1 | 1.0 | 28 | 40 |
| Comparative Example 4 | PVA4 | Presence | 12.0 | 5 | 2400 | 2.8 | 0.3 | 26 | 38 |
| Comparative Example 5 | PVA5 | Presence | 12.0 | 45 | 44 | 1.5 | 0.7 | 1 | 12 |
| Comparative Example 6 | PVA1 | Presence | 14.0 | 7 | 571 | 4.5 | 0.3 | 30 | 43 |

TABLE 2-continued

|  | Fiber | | Roof Tile | | | | | | |
|---|---|---|---|---|---|---|---|---|---|
|  | Fiber Addition Rate[2] (kg/sec/t) | Fiber Addition Duration Time (sec) | Specific Gravity (g/cm³) | Bending Strength (N/mm²) | Roof Tile Bending Test (EN490) | Falling Ball Test (JIS A1408) | Appearance | | Roof Tile Weight (kg/m²) |
|  |  |  |  |  |  |  | Surface | Overlapping Part |  |
| Example 8 | 0.8 | 9 | 1.89 | 11.0 | Pass | Pass | A | A | 32 |
| Example 9 | 0.8 | 9 | 1.87 | 10.0 | Pass | Pass | A | A | 34 |
| Example 10 | 0.8 | 9 | 1.87 | 8.0 | Pass | Pass | A | A | 35 |
| Example 11 | 0.8 | 4 | 1.91 | 9.0 | Pass | Pass | A | A | 35 |
| Example 12 | 0.8 | 23 | 1.86 | 12.0 | Pass | Pass | A | A | 35 |
| Example 13 | 0.8 | 31 | 1.83 | 9.0 | Pass | Pass | A | A | 34 |
| Example 14 | 0.8 | 9 | 1.84 | 9.7 | Pass | Pass | A | A | 33 |
| Comparative Example 3 | 0.8 | 13 | 1.83 | 5.0 | Fail | Pass | C | C | 35 |
| Comparative Example 4 | 0.8 | 4 | 1.83 | 4.8 | Fail | Pass | C | C | 35 |
| Comparative Example 5 | 0.8 | 9 | 1.85 | 4.5 | Fail | Pass | A | A | 35 |
| Comparative Example 6 | 0.8 | 4 | 1.81 | 6.0 | Fail | Pass | C | C | 35 |

[1]Content of fibers donates a ratio of the fibers to the solid content of the mixture.
[2]Fiber addition rate donates an addition rate per ton of the solid content of the mixture.

As shown in Table 1, in the roof tiles of Examples 1 to 4, the fibers are remarkably uniformly dispersed, and each of the roof tiles has a good appearance and has sufficient properties in the bending strength test of the cut piece, the roof tile bending test and the falling ball test. Furthermore, such a high strength is achieved, and additionally, the weight of the roof tile can be reduced.

As shown in Table 1, in the roof tiles of Examples 5 to 7, the fibers are uniformly dispersed to an acceptable extent and each of the roof tiles has properties which have no practical problem in appearance, the bending strength test of the cut piece and the falling ball test. Although the roof tiles failed the roof tile bending test, they had properties which had no practical problem in the bending strength test and the falling ball test, and therefore, the results are acceptable in the present invention.

Since the roof tile obtained in Comparative Example 1 has no fiber, the results in any of the bending strength test of the cut piece, the roof tile bending test and the falling ball test are insufficient. In the roof tile obtained in Comparative Example 2, since the addition rate of the fibers was too fast, the fibers were not sufficiently uniformly dispersed and the fibers got agglomerated inside the roof tile, and additionally, the fibers remarkably got entangled with each other, so that a lot of buckled portions were formed. Thus, the roof tile had a poor appearance, and additionally had an insufficient strength in the bending strength test of the cut piece and the roof tile bending test.

As shown in Table 2, it can be seen that each of the roof tiles obtained in Examples 8 to 13 has a high strength in the bending strength test of the cut piece. Therefore, it can be seen that it is also possible to reduce the weight of the roof tile and simultaneously achieve the high strength according to the present invention. In addition, it can be seen that each of the roof tiles obtained in Examples 8 to 13 also has a good appearance. On the other hand, Comparative Examples 3 to 6 represented insufficient results in the bending strength test of the cut piece. Furthermore, each of the roof tiles obtained in Comparative Examples 3, 4 and 6 also had a poor appearance.

INDUSTRIAL APPLICABILITY

The roof tile in the present invention is lightweight and has a high strength, and therefore, the roof tile is available as various roofing materials and can also be used as a wall tile, a floor tile or the like.

EXPLANATION OF SYMBOLS

X: Fiber
Y: Buckled Portion
1: Cut End Surface
2: Roof Tile Main Body Part
3: Upper Surface
5: Lower Surface
7: Fiber
11: Cut End Surface
12: Roof Tile Main Body Part
13: Upper Surface
14: Overlapping Part
15: Lower Surface
16: Overlapped Part
M: Molding Material
H: Hopper
P: Pallet
C: Oil Hydraulic Cylinder
R: Roller
S: Slipper
B: Blade
T: Table
V: Conveyor

What is claimed is:

1. A roof tile, comprising fibers satisfying the following requirements (1) to (3):
   (1) having an average fiber diameter of 50 μm or less;
   (2) having an aspect ratio of 50 to 2000; and
   (3) having three or less buckled portions per fiber.

2. The roof tile according to claim 1, wherein:
   the roof tile has an upper surface hardened by non-mold shaping, a lower surface hardened by mold shaping, and side surfaces; and the roof tile has a cut end surface on at least one of the side surfaces.

3. The roof tile according to claim 2, comprising at least one selected from the group consisting of a polyvinyl alcohol-based fiber, a polyethylene fiber, a polypropylene fiber, an acrylic fiber and an aramid fiber.

4. The roof tile according to claim 1, wherein a 30 mm×150 mm cut piece of the roof tile has a bending strength of 5 N/mm$^2$ or higher.

5. The roof tile according to claim 1, wherein the fibers are optionally present as fiber agglomerates, and a content of the fiber agglomerate having an equivalent circle diameter of 3 mm or more is 25% by weight or less relative to the total content of the fibers.

6. The roof tile according to claim 1, wherein a CV value as dispersion variance of the fibers is 35% by weight or less.

7. The roof tile according to claim 1, wherein the roof tile has a content of the fibers of from 0.1 to 2% by weight.

8. The roof tile according to claim 1, wherein the fibers are at least one selected from the group consisting of a polyvinyl alcohol-based fiber, a polyethylene fiber, a polypropylene fiber, an acrylic fiber and an aramid fiber.

9. The roof tile according to claim 1, wherein:
the roof tile comprises a fine aggregate; and
the fine aggregate has an average particle diameter of from 0.1 to 5 mm.

10. A molding material for producing the roof tile according to claim 1, the molding material comprising at least cement, a fine aggregate, fibers and water,
wherein the fibers are optionally present as fiber agglomerates, and a content of the fiber agglomerate having an equivalent circle diameter of 3 mm or more is 25% by weight or less relative to the total content of the fibers.

11. A process for producing the roof tile according to claim 1, the process comprising:

adding the fibers into a mixture comprising cement, a fine aggregate and water at an addition rate of 5 kg/sec or less per ton of solid content of the mixture and simultaneously dispersing the fibers to obtain a molding material;
supplying the molding material into a hopper of a roller/slipper type extrusion device;
filling a plurality of adjacent pallets with the supplied molding material from a lower side of the hopper;
compressing the molding material with a roller and a slipper to form a continuous band on the pallets;
cutting the band with a cutting blade to form individual unhardened roof tiles on the individual pallets; and
hardening the unhardened roof tiles.

12. The process according to claim 11, wherein the fibers added into the mixture are optionally present as fiber agglomerates and a content of the fiber agglomerates having an equivalent circle diameter of 3 mm or more is 25% by weight or less relative to the total content of the fibers.

13. The process according to claim 11, wherein a CV value as dispersion variance of the fibers in the molding material obtained in said adding is 35% by weight or less.

14. The process according to claim 11, wherein:
the fibers are subjected to disaggregation treatment and then added into the mixture; and
the disaggregation treatment is at least one treatment selected from the group consisting of a treatment of passing the fibers between facing rotation gears to disaggregate the fibers; a treatment of hooking the fibers on a roll having protrusions to disaggregate the fibers; a treatment of disaggregating the fibers by a shearing force of a rotary disk having a groove; and a treatment of disaggregating the fibers by a collision force of air flow.

* * * * *